United States Patent Office 3,002,992
Patented Oct. 3, 1961

3,002,992
ALKOXYALKYL ESTERS OF p-METHOXY-CINNAMIC ACID
Thomas F. Wood, Wayne, N.J., assignor to The Givaudan Corporation, New York, N.Y., a corporation of New Jersey
No Drawing. Filed Oct. 10, 1958, Ser. No. 766,405
5 Claims. (Cl. 260—473)

This invention relates to novel chemical compounds and compositions containing same, as well as to processes for preparing said compounds and compositions.

The novel chemical compounds of this invention may be represented by the following structural formula:

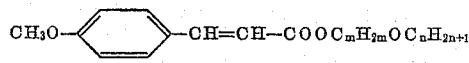

where $m$ and $n$ are integers whose sum is at least 4.

Among the specific members of the herein-disclosed novel compounds the following are noted:

2-ethoxyethyl p-methoxycinnamate, whose formula is

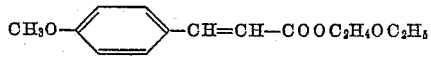

3-methoxybutyl p-methoxycinnamate, whose formula is

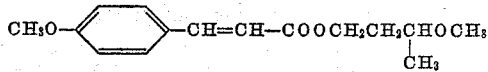

1-methoxy-2-propyl p-methoxycinnamate, whose formula is

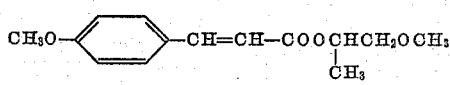

and 2-butoxyethyl 6-methoxycinnamate, whose formula is

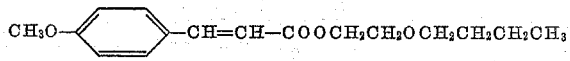

The novel compounds of this invention are colorless, odorless liquids having high boiling points. They are effective sunscreening agents and are of value in the preparation of practical lotions and creams for use as suntanning aids, having, among other desirable properties for such use, the property of being highly soluble in solvents commonly used in the preparation of so-called suntan lotions and creams. In addition to possessing good light absorption characteristics in the ultraviolet region for application as sunscreening agents, showing maxima at 308 millimicrons and high absorption in the region of 290–320 millimicrons, it has been found that cosmetic sunscreening lotions and creams containing these novel compounds do not color appreciably when exposed to sunlight over extended periods of time. Also, said lotions and creams are non-irritating to the skin, even in sensitive areas, as on the lips. It is also significant to note that the novel compounds of this invention are non-toxic and are prepared easily and inexpensively.

That the novel compounds of this invention would possess properties making them especially suitable as sunscreening agents was quite unexpected. This is so because of the fact that such agents must possess a unique combination of properties to serve adequately and because compounds of related chemical structure were found to lack said combination of properties.

Compositions which are to serve as anti-sunburn compositions and yet are to permit desirable tanning of the skin should preferably absorb the sun's rays having wave lengths within the range of approximately 2,800 to 3,200 Angstrom units but should permit rays of longer lengths to pass through the composition to the skin, as these longer wave lengths aid in the formation of the tan of the skin.

In addition to the indicated optical properties, compositions suitable for cosmetic application for sunscreening purposes should possess certain other desirable properties. For example, such compositions should have high stability, particularly when spread in a thin film on the surface of the skin. Also, when so spread the compositions should form films of non-crystalline form. Solubility in convenient and non-toxic carriers also should be a property of the active sunscreening agents. Other desirable properties are non-toxicity of the active agent and effectiveness in relatively small concentrations, both from the standpoint of expense of the product and from the general undesirability of applying high concentrations of active substances to the surface of the skin. Also, active sunscreening agents should be non-staining, colorless and substantially odor-free or at least they should not possess unpleasant odors.

It has been found that many substances heretofore proposed for the purpose mentioned possess one or more disadvantages and disabilities. Such materials, as benzyl cinnamate, benzyl salicylate, methyl salicylate, aesculetin and the like, though apparently capable on theoretical grounds of absorbing a substantial amount of ultra-violet light, must be used in high concentrations, and are therefore expensive to use. Substances such as the ethyl, propyl, butyl, and amyl esters of para-amino benzoic acids have been suggested for the purpose but might be objectionable because they discolor fabrics and have an anesthetic action.

Indeed, it has been found that compounds even more closely related chemically to the novel alkoxyalkyl esters of p-methoxycinnamic acid of this invention do not possess the aforesaid required combination of properties for use as sunscreening agents. Reference is made to simple esters of p-methoxycinnamic acid, such as methyl p-methoxycinnamate. Such esters have the unfortunate property of causing lotions and creams containing them to produce an extremely unpleasant sensation in some people when in contact with the lips. While this serious disadvantage may be overcome by the use of higher molecular esters such as n-octyl, benzyl, cetyl or diethylaminoethyl esters, these latter compounds have the disadvantageous properties of discoloring badly in lotions when exposed to sunlight for a few days and of crystallizing out from lotions and cosmetic oils, on standing. Additionally, the higher molecular weight esters are not as effective on a weight basis as the lower molecular weight esters.

The unusual degree of specificity of action of sunscreening agents is strikingly shown by the fact that the homologous 2-methoxyethyl p-methoxycinnamate yields cosmetic lotions which are so irritating to the lips, producing a burning sensation in most people on whom the lotion was tested, as to be of no practical value.

The novel compounds of this invention are conveniently and economically prepared by reacting the known ethyl p-methoxycinnamate with the required alkoxyalkanols at 90°–125° C. in the presence of an ester interchange catalyst such as sodium methylate or aluminum isopropylate. The ethyl alcohol produced in the reaction can be removed as it is formed by distillation either at atmospheric pressure or reduced pressure; also the reaction may be conducted using a hydrocarbon solvent and distilling out the hydrocarbon-ethanol azeotrope as it forms. This latter procedure has been found advantageous in accelerating the reactions and bringing them to completion. Removal of the ethyl alcohol by stirring the reaction mixture under reduced pressure gives excellent results where the alkoxyalkanol employed has a moderately high boiling point, such as for example butyl Cellosolve (2-butoxyethanol, B.P. 171° C.). The interchange reaction proceeds satisfactorily at temperatures of 30°–150° C. The preferred range is 90° to 125° C. where the reaction proceeds at a practical rate and the formation of by-products is minimized. Finally the reaction mix is acidified with glacial acetic acid, washed successively with water, sodium carbonate solution, finally with water to neutrality, and after removal of solvent, vacuum-distilled.

The amount of interchange catalyst normally used is from 1 to 4% by weight of the ethyl p-methoxycinnamate employed. Equimolar amounts of the reactants may be used but it is preferred to use an excess of the alkoxyalkanol, usually 10 to 20% excess over the theoretical in order to insure complete conversion of the ethyl ester to the alkoxyalkyl ester. An even greater excess of the alcohol may be used without adversely affecting the reaction and may be desirable when the ethanol produced is removed under reduced pressure since some of the alkoxyalkanol may be partially carried over with the ethanol.

The starting materials for the preparation of the esters disclosed herein are readily obtainable. The necessary ethyl p-methoxycinnamate is readily prepared by condensing anisic aldehyde with ethyl acetate in the presence of sodium, following the procedure described by D. Vorländer, Ann. 294, 295 (1897). The alkoxyalkanols necessary for the preparation of the novel compounds are all commercially-available, low-cost solvents. Among these solvents used may be mentioned: Cellosolve (ethylene glycol monoethyl ether, 3-methoxybutanol, Dowanol PM (1-methoxy-2-propanol) and butyl Cellosolve (ethylene glycol monobutyl ether).

Other methods which might be used for the preparation of the desired esters are noteworthy. The known p-methoxycinnamic acid may be reacted with the required alkoxyalkanol in the presence of a small amount of mineral acid to effect esterification. Condensation of anisic aldehyde with the acetates of the alkoxyalkanols by means of sodium alcoholate or metallic sodium will also lead to the desired esters.

Novel sunscreening compositions such as cosmetic oils, alcoholic solutions, lotions and creams may be prepared with the novel compounds of this invention. Such compositions possess the aforesaid combination of desired properties rendering them particularly suitable as suntanning and anti-sunburn aids.

Depending on the degree of protection desired and on the vehicle employed, excellent results have been obtained with compositions containing from 1 to 2 percent of the novel compounds of this invention. Larger amounts may be used, if desired.

The novel sunscreening compositions of this invention are not confined to any particular classes of cosmetics or to any particular formulations. Nevertheless, it is preferred to employ the novel compounds of this invention along with a substantially greater amount of a non-toxic vehicle compatible with the skin, such as corn oil, ethanol, isopropanol, sesame oil, propylene glycol, benzyl alcohol, oleyl alcohol, isopropyl esters of fatty acids such as myristic and palmitic acids, white spirit, petrolatum oil, etc.

The novel sunscreening compositions are applied to the skin in known and conventional manner, normally just prior to the user exposing himself or herself, as the case may be, to the rays of the sun.

In order further to clarify this invention, the following examples are given, it being understood that they are for purposes of illustration and not for purposes of limitation. The temperatures are in degrees centigrade and the percentages are by weight, unless otherwise stated.

EXAMPLE I

*2-ethoxyethyl p-methoxycinnamate*

Into a suitably provisioned apparatus was charged 206 g. ethyl p-methoxycinnamate (1 mole), 300 g. toluene, 125 g. ethylene glycol monoethyl ether solvent and 4 g. sodium methylate powder. With stirring there was slowly distilled off 73 g. of toluene-ethanol azetrope (B.P. 76–78°) which analyzed 58% ethanol. The resulting reaction mix was cooled to 60°, acidified with glacial acetic acid and washed successively with water, 5% soda ash solution and again with water to neutrality. The excess toluene was removed by distillation and the residual liquid vacuum distilled yielding 219.5 g. of 2-ethoxyethyl p-methoxycinnamate, B.P. 184–187° C. at 2 mm. The product was a nearly colorless, moderately viscous liquid, $n_D^{20}$ 1.5670, sp. gr. 25°/25° C. 1.1000, S.V.=225.5 (theory 224).

EXAMPLE II

*3-methoxybutyl p-methoxycinnamate*

Into a suitably provisioned apparatus was charged 206 g. ethyl p-methoxycinnamate (1 mole), 120 g. 3-methoxy-1-butanol (1.15 mole), 300 g. toluene, and 4 g. sodium methylate powder. With stirring there was slowly distilled off 79 g. toluene-ethanol azeotrope (B.P. 77–79°) which analyzed 56% ethanol. The resulting reaction mix was cooled to 60°, acidified with glacial acetic acid and washed successively with water, 5% soda ash solution and again with water to neutrality. The excess toluene was removed by distillation and the residual liquid vacuum distilled yielding 175.5 g. of 3-methoxybutyl p-methoxycinnamate, B.P. 184–191° C. at 2 mm., $n_D^{20}$ 1.5585. The product was a nearly colorless, moderately viscous liquid which was very soluble in all the usual solvents.

EXAMPLE III

*1-methoxy-2-propyl p-methoxycinnamate*

Into a suitable provisioned apparatus was charged 206 g. ethyl p-methoxycinnamate (1 mole), 300 g. toluene, 125 g. 1-methoxy-2-propanol (propylene glycol methyl ether which is available commercially under the brand name Dowanol PM), and 4 g. sodium methylate powder. With stirring there was slowly distilled out 69 g. of toluene-ethanol azeotrope, B.P. 76–78°, which analyzed 63% ethanol. The resulting reaction mix was cooled to 60°, acidified with glacial acetic acid and washed successively with water, 5% soda ash solution and again with water to neutrality. The excess toluene was removed by distillation and the residual liquid vacuum distilled. There was obtained 185 g. of 1-methoxy-2-propyl p-methoxycinnamate, a nearly colorless liquid, B.P. 170–177° C. at 2 mm., $n_D^{20}$ 1.5655, sp. gr. 25°/25° C. 1.0993, saponification value 229.7 (theory=224).

EXAMPLE IV

*2-n-butoxyethyl p-methoxycinnamate*

Into a suitably provisioned apparatus was charged 103 g. ethyl p-methoxycinnamate (0.5 mole), 100 g. butyl Cellosolve (2-butoxyethanol) (0.85 mole), and 2 g. sodium methylate powder. The batch was stirred and gradually warmed to 120° C. under vacuum (60–75 mm. pressure) to remove the ethanol produced in the reaction. This process required about 2¾ hours as follows:

| Time | Vapor, °C. | Pot., °C. | Vacuum, mm. |
|---|---|---|---|
| 1:35 p.m. | 35 | 69 | 75 |
| 1:49 p.m. | 26 | 69 | 61 |
| 2:16 p.m. | 24 | 80 | 62 |
| 3:06 p.m. | 24 | 95 | 59 |
| 3:36 p.m. | 24 | 97 | 67 |
| 4:15 p.m. | 24 | 120 | 65 |

After cooling to 60° C. the batch was acidified with 4 ml. glacial acetic acid, diluted with 250 ml. toluene and 100 ml. water. It was stirred and allowed to settle. The lower aqueous layer was discarded and the oil layer washed successively with water, 5% sodium carbonate solution and again with water to neutrality. The toluene was removed by distillation and the residual liquid vacuum distilled yielding 117 g. of 2-n-butoxyethyl p-methoxycinnamate, B.P. 201–204° C. at 2.5 mm. The product was a colorless, moderately viscous liquid, $n_D^{20}$ 1.5520, sp. gr. 25°/25° C. 1.0650, saponification value 204.3 (theory 202). It is very soluble in nearly all commonly used solvents. In common with the aforementioned alkoxyalkyl esters of p-methoxycinnamic acid it shows excellent light absorption characteristics in the ultraviolet region for use as a sunscreening agent, having strong absorption in the region of 290–320 m$\mu$ with a maximum at 308 m$\mu$. It also fulfills all of the other necessary requirements for a practical sunscreen agent, being highly soluble in cosmetic solvents, non-irritating to the skin, stable to light and non-toxic.

EXAMPLE V

The 2-ethoxyethyl p-methoxycinnamate, described above in Example I was incorporated into a cosmetic emulsified lotion of the following formula:

| | Grams |
|---|---|
| Diethyleneglycol monostearate | 2.0 |
| Stearic acid | 3.5 |
| Cetyl alcohol | 0.5 |
| Oleyl alcohol | 4.0 |
| Ethoxyethyl p-methoxycinnamate | 1.5 |
| Triethanolamine | 1.0 |
| Water | 87.375 |
| Perfume | .125 |

The lotion was prepared as follows:

All of the items of the formula except the water were mixed together and warmed to 75° C. with stirring to produce a clear solution. The water portion was also heated to 75° C. and added to the hot (75° C.) solution with stirring. The resulting lotion was cooled gradually to room temperature with stirring. This lotion proved to be very effective in preventing sunburn in humans, when applied to the skin before exposure. It was non-irritating to the lips. It discolored only slightly when contained in a clear glass bottle and exposed to direct sunlight for 30 days. No change was observed in the character of its U.V. absorption curve during this treatment.

An emulsified lotion made in accordance with the foregoing formula was compared as a sunburn preventative with a lotion containing 2.0% isobutyl p-aminobenzoate. When evaluated by the method of L. C. Harber (J. Invest. Dermatol. 23, 427, December 1954) the lotion containing ethoxyethyl p-methoxy-cinnamate proved to be excellent and was superior to the one containing isobutyl p-aminobenzoate.

An emulsified lotion as above except that it contained 2.0% ethoxyethyl p-methoxycinnamate was tested to determine irritation effect on humans. The lotion was rubbed onto the lips of 9 subjects (3 male, 6 female). No sensation was reported. The same subjects reported slight to severe stinging for lotions containing 2% ethyl p-methoxycinnamate and a numbing sensation for a lotion containing 2.0% isobutyl p-aminobenzoate.

EXAMPLE VI

A lotion of the following formula was prepared in a manner similar to that in which the lotion of Example V was prepared.

| | Grams |
|---|---|
| Diethylene glycol monostearate | 2.0 |
| Stearic acid | 1.5 |
| Cetyl alcohol | 0.5 |
| Deltyl (isopropyl myristate) | 6.0 |
| 2-ethoxyethyl p-methoxycinnamate | 2.0 |
| Triethanolamine | 0.5 |
| Benzyl alcohol | 0.8 |
| Water | 86.7 |

This lotion was shown to be safe for contact with human skin by studies using the repeated insult patch test method of Shelanski and Shelanski (Proceedings of the Toilet Goods Association #19, May 1953).

Suntan oils, hydroalcoholic suntan lotions and suntan creams were prepared with ethoxyethyl p-methoxycinnamate as the active suntanning agent. All of these compositions possessed the aforesaid desirable properties as sunscreening preparations. The suntan oils and hydroalcoholic lotions were tested on fabric for discoloration in light. The very slight yellowing which occurred was completely removed by laundering.

The novel chemicals whose preparation is given in Examples II to IV, inclusive, were incorporated into an emulsified lotion in accordance with the formulation given in Example V. The results were substantially the same as given in said example.

While this invention has been described in detail it will be obvious to those skilled in the art, after understanding this invention, that various changes may be made therein without departing from the spirit or scope thereof. It is aimed, in the appended claims, to cover all such changes.

What is claimed is:

1. Liquid chemical compounds represented by the following structural formula:

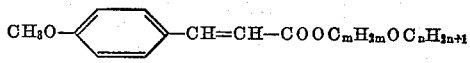

where $m$ and $n$ integers whose sum is 4 to 6.
2. 2-ethoxyethyl p-methoxycinnamate.
3. 3-methoxybutyl p-methoxycinnamate.
4. 1-methoxy-2-propyl p-methoxycinnamate.
5. 2-n-butoxyethyl p-methoxycinnamate.

References Cited in the file of this patent

UNITED STATES PATENTS

| 2,213,717 | Poizat et al. | Sept. 3, 1940 |
| 2,580,461 | Pearl | Jan. 1, 1952 |

OTHER REFERENCES

Beilstein, X, 299 (1927).

Hickinbottom: "Reactions of Organic Compounds," pages 266 and 267, Longmans, Green & Co. (1948).

Giese et al.: J. Am. Pharm. Assoc., sci. ed., January 1950, pp. 31, 167–90B.